US010359820B2

(12) United States Patent
Shi (10) Patent No.: US 10,359,820 B2
(45) Date of Patent: Jul. 23, 2019

(54) ELECTRONIC DEVICE AND CONTROL METHOD THEREOF (71) Applicant: Lenovo (Beijing) Co., Ltd., Beijing (CN)

(72) Inventor: Xinyi Shi, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 146 days.

(21) Appl. No.: 15/492,133

(22) Filed: Apr. 20, 2017

(65) Prior Publication Data

US 2017/0344100 A1    Nov. 30, 2017

(30) Foreign Application Priority Data

May 31, 2016 (CN) .......................... 2016 1 0379641
May 31, 2016 (CN) .......................... 2016 1 0379817

(51) Int. Cl.
| G06F 1/00 | (2006.01) |
| G06F 1/26 | (2006.01) |
| G06F 1/32 | (2019.01) |
| G06F 1/20 | (2006.01) |
| G06F 1/3206 | (2019.01) |
| G06F 1/3234 | (2019.01) |

(52) U.S. Cl.
CPC ............ G06F 1/206 (2013.01); G06F 1/3206 (2013.01); G06F 1/3234 (2013.01); G06F 1/26 (2013.01)

(58) Field of Classification Search
CPC ..................................... G06F 1/32; G06F 1/26
See application file for complete search history.

(56) References Cited

U.S. PATENT DOCUMENTS

| 7,069,189 B2 * | 6/2006 | Rotem ..................... G01K 7/42 374/E17.001 |
| 2003/0217297 A1 * | 11/2003 | Gschwind ............... G06F 1/206 713/300 |
| 2008/0005603 A1 * | 1/2008 | Buch ....................... G06F 1/206 713/320 |
| 2014/0075223 A1 * | 3/2014 | Tan ........................ G06F 1/3243 713/322 |
| 2014/0240031 A1 | 8/2014 | Vadakkanmaruveedu et al. |

(Continued)

FOREIGN PATENT DOCUMENTS

| CN | 1860447 A | 11/2006 |
| CN | 101639723 A | 2/2010 |
| CN | 102012272 A | 4/2011 |

(Continued)

*Primary Examiner* — Phil K Nguyen
(74) *Attorney, Agent, or Firm* — Anova Law Group, PLLC (57) ABSTRACT Electronic device and control method of the electronic device are provided. The method includes detecting a current temperature of the electronic device. In response to the current temperature matching a first condition, the method controls an app at the electronic device to switch from a first running state to a second running state. In response to the current temperature matching a second condition, the method controls currently-operating components at the electronic device to switch from a first operating state to a second operating state. The disclosed control method and electronic device ensure the normal operation of the electronic device and the regular user experience in using the electronic device.

18 Claims, 7 Drawing Sheets

(56) References Cited

U.S. PATENT DOCUMENTS

2016/0378150 A1* 12/2016 Sega .................... H04M 19/04
                                                          700/299

FOREIGN PATENT DOCUMENTS

| CN | 102510422 A  | 6/2012  |
|----|--------------|---------|
| CN | 102968139 A  | 3/2013  |
| CN | 103119850 A  | 5/2013  |
| CN | 104871109 A  | 8/2015  |
| CN | 105183111 A  | 12/2015 |
| CN | 105425923 A  | 3/2016  |
| JP | 2004126968 A | 4/2004  |

* cited by examiner

ELECTRONIC DEVICE AND CONTROL METHOD THEREOF

CROSS-REFERENCES TO RELATED APPLICATIONS

This application claims priority of Chinese Patent Applications No. 201610379817.3 and 201610379641.1, both filed on May 31, 2016, the entire contents of all of which are hereby incorporated by reference.

FIELD OF THE INVENTION

The present disclosure generally relates to the field of device control technology and, more particularly, relates to an electronic device and a control method thereof.

BACKGROUND

With the development of electronic technology, more and more apps become available on devices such as mobile phones to meet the growing user demands.

However, apps running on a device may use too many processor resources. Therefore, the operation of the processor may generate a substantial amount of heat, which leads to an overheated outer shell of the device, affecting the user experience.

To ensure quality user experience, it is desirable to pre-control the device heating. The disclosed method for temperature control and electronic device are directed to solve one or more problems set forth above and other problems in the art.

BRIEF SUMMARY OF THE DISCLOSURE

An aspect of the present disclosure includes a control method. The control method includes detecting a current temperature of an electronic device, controlling an app at the electronic device to switch from a first running state to a second running state in response to the current temperature matching a first condition, and controlling currently-operating components at the electronic device to switch from a first operating state to a second operating state in response to the current temperature matching a second condition.

Another aspect of the present disclosure includes an electronic device. The electronic device includes a temperature detection unit and a processor. The temperature detection unit detects a current temperature of the electronic device. The processor controls an app at the electronic device to switch from a first running state to a second running state in response to the current temperature matching a first condition, and also controls currently-operating components at the electronic device to switch from a first operating state to a second operating, state in response to the current temperature matching a second condition.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to example embodiments of the invention, which are illustrated in the accompanying drawings. Wherever possible, the same reference numbers will be used throughout the drawings to refer to the same or like parts. The described embodiments are some but not all of the embodiments of the present invention. Based on the disclosed embodiments and without inventive efforts, persons of ordinary skill in the art may derive other embodiments consistent with the present disclosure, all of which are within the scope of the present invention.

Figure 1:
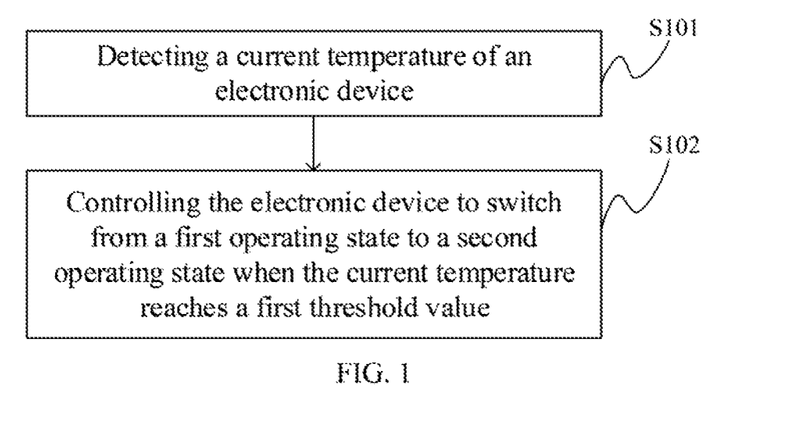
FIG. 1 illustrates a flow chart of an example of a control method consistent with various embodiments of the present disclosure.

The present disclosure provides a method for controlling the temperature of an electronic device. FIG. 1 illustrates a flow chart of a method to realize temperature control for an electronic device consistent with various embodiments of the present disclosure. Referring to FIG. 1, the control method may include the following steps.

In S101: Detecting the current temperature of the electronic device.

In S102: Controlling the electronic device to switch from a first operating state to a second operating state when the current temperature reaches a preset first threshold value.

Figure 2:
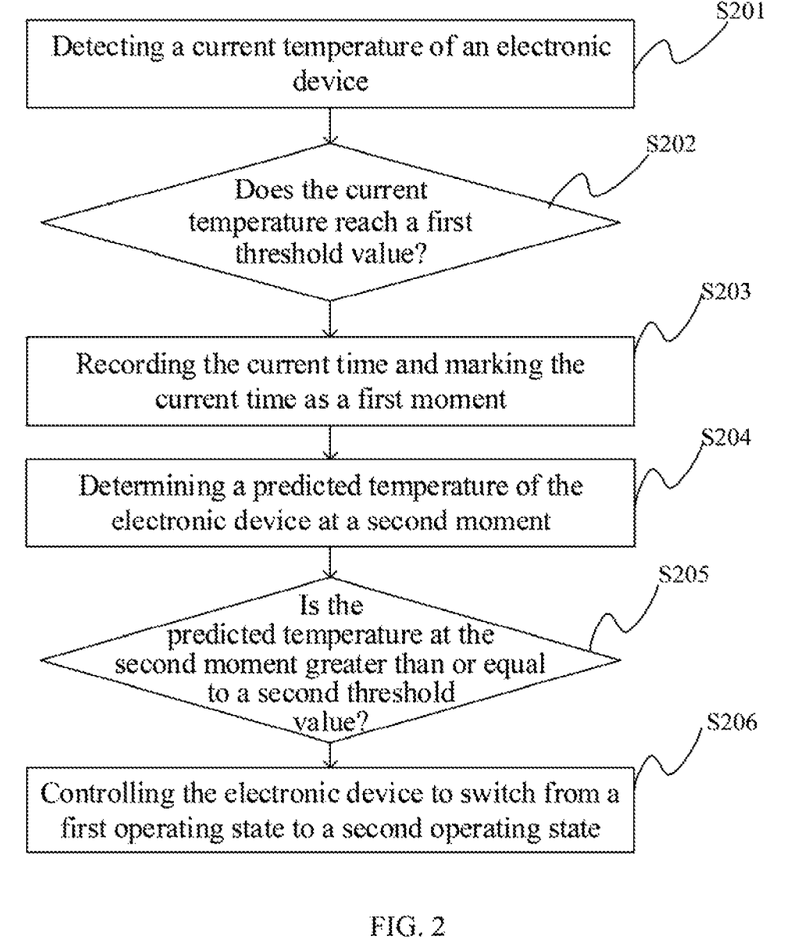
FIG. 2 illustrates a flow chart of another example of a control method consistent with various embodiments of the present disclosure.
Figure 3:
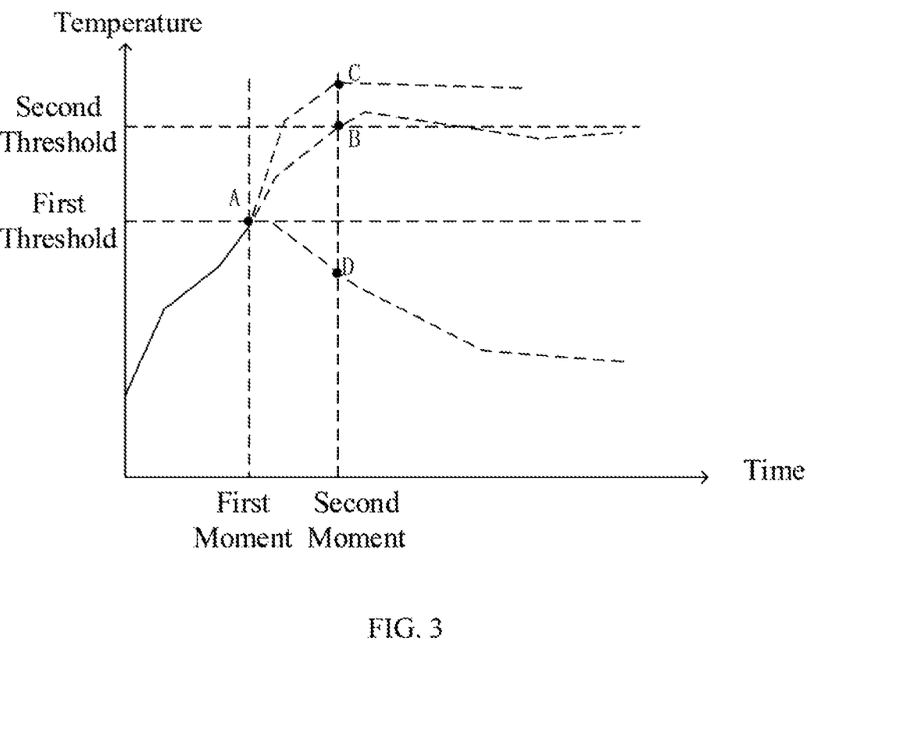
FIG. 3 illustrates a schematic diagram of the temperature-time correlation according to the control method illustrated in FIG. 2.

FIG. 2 illustrates a flow chart of another method to realize temperature control for an electronic device consistent with the disclosed embodiments. FIG. 3 illustrates a schematic diagram of the temperature-time correlation according to the control method illustrated in FIG. 2. Referring to FIG. 2, the control method may include the following steps.

S201: Detecting the current temperature of the electronic device.

In one embodiment, the current temperature of the electronic device may be the temperature of a component at the electronic device. For example, the component may be a major beating component of the electronic device, such as a processor, a battery, etc.

In S202: Determining whether the current temperature of the electronic device reaches a preset first threshold value. When the current temperature of the electronic device reaches the first threshold value, Step S203 may be executed. However, when the current temperature of the electronic device does not reach the first threshold value, the disclosed control method may return back to execute Step S201, i.e. detecting the current temperature of the electronic device again, and thus refresh the temperature control for the electronic device.

The first threshold value may be determined based on actual needs or historical/empirical data. In one embodiment, the first threshold value may be a threshold value lower than a hot-touching temperature, i.e. a temperature at which the user may feel the electronic device warm/hot by holding the electronic device. That is, when the current temperature of the electronic device reaches the first threshold value, the user may still not be able to feel warm/hot by holding the electronic device. For example, referring to FIG. 3, the first threshold value may be a temperature represented by point A.

In S203: Recording the current time, and marking the current time as a first moment.

In S204: Determining a predicted temperature of the electronic device at a second moment.

The second moment may be a moment with a preset time difference behind the first moment. For example, the second moment may be the moment corresponding to point B in FIG. 3. In one embodiment, when the current temperature of the electronic device reaches the first threshold voltage, a predicted temperature of the electronic device at the second moment may be predicted.

Further, the preset time difference may be determined based on the historical heating data of the electronic device. For example, the historical heating data may include the heat transfer rate of the electronic device, or the transfer time for the heat generated by the heating component to reach the outer shell of the electronic device. In one embodiment, the transfer time required for the heat generated by a heating component to reach the outer shell may be calculated by using the heat transfer rate and the distance between the heating component and the outer shell of the electronic device. Alternatively, the transfer time may also be directly extracted from the historical data. Further, after the transfer time is determined, the transfer time or a value below the transfer time may be defined as the time difference.

In one embodiment, the predicted temperature, at the second moment may be determined based on the operating state of the electronic device such as the number of running apps, the operating frequency of the processor, etc. For example, when the operating frequency of the processor is above a value of Z, then it is determined that the predicted temperature at the second moment may reach a temperature value of X; when the operating frequency of the processor is less than Z, then it is determined that the predicted temperature at the second moment may reach a temperature value of Y; and X may be greater than Y. In another example, when the number of the running apps at the electronic device is M, then it is determined that the predicted temperature at the second moment may reach a value of Y; when the number of running apps at the electronic device is N; and N may be greater than M, then it is determined that the predicted temperature at the second moment may reach a value of X.

S205: Determining whether the predicted temperature of the electronic device at the second moment is greater than or equal to a preset second threshold value. When the predicted temperature is greater than or equal to the second threshold value, Step S206 may be executed. For example, referring to FIG. 3, the predicted temperature at point C is higher than the temperature at point B, the disclosed control method may move forward to execute Step S206. However, when the predicted temperature is less than the second threshold value, the disclosed control method may return back to execute Step S201, i.e. detecting the current temperature of the electronic device again, and thus refresh the temperature control for the electronic device. For example, referring to FIG. 3, the predicted temperature at point D is lower than the temperature at point B, the control method may return back to execute Step S201 again.

In S206: Controlling the electronic device to switch from a first operating state to a second operating state such that the actual temperature of the electronic device at the second moment may become lower than the second threshold value.

According to the disclosed control method, by switching the operating state of the electronic device, the heat generated by the electronic device may be reduced, and thus the actual temperature of the electronic device at the second moment may not be able to reach the second threshold value.

For example, referring to FIG. 3, at a first moment, the temperature of the electronic device reaches a first threshold value. Accordingly, a predicted temperature at a to second moment with a preset time difference behind the first moment may be predicted. Further, when the predicted temperature reaches a second threshold value, it is indicated that by keeping the current operating state, the electronic device may have a temperature reaching or even exceeding the second threshold value at the second moment. Therefore, the operating state of the electronic device may be switched at the first moment to reduce the heat generated by the electronic device.

Further, the second moment and the first moment may have a time difference, and the time difference may be shorter than or equal to the transfer time required far the heat generated by the processor or other heating component to reach the outer shell of the electronic device. Therefore, when the operating state of the electronic device is immediately switched at the first moment once the predicted temperature at the second moment is determined to reach or exceed the second threshold value, the actual temperature of the electronic device at the second moment may then not be able to reach the second threshold value. As such, the actual temperature of the electronic device may be ensured to stay at or below the second threshold value. Therefore, the normal operation of the electronic device may be sustained, and in the meantime, the heat generated by the processor or other heating component may not cause overheating at the outer shell of the electronic device, and thus may not bring the user an overheating feeling.

According to the disclosed control method, when the temperature of the electronic device reaches a first threshold value at a first moment, a predicted temperature at a second moment is determined. Specifically, the second moment is behind the first moment with a preset time difference. Further, when the predicted temperature reaches a second threshold value, it is indicated that the temperature of the electronic device at the second moment may affect the operation of the electronic device or may reach a temperature point bringing the user an overheating feeling. At this time, the operating state of the electronic device is switched to ensure that the actual temperature of the electronic device at the second moment does not reach the second threshold value. As such, the temperature of the electronic device may always remain a value below the second threshold value, ensuring the normal operation of the electronic device and the regular user experience in using the electronic device.

Figure 4:
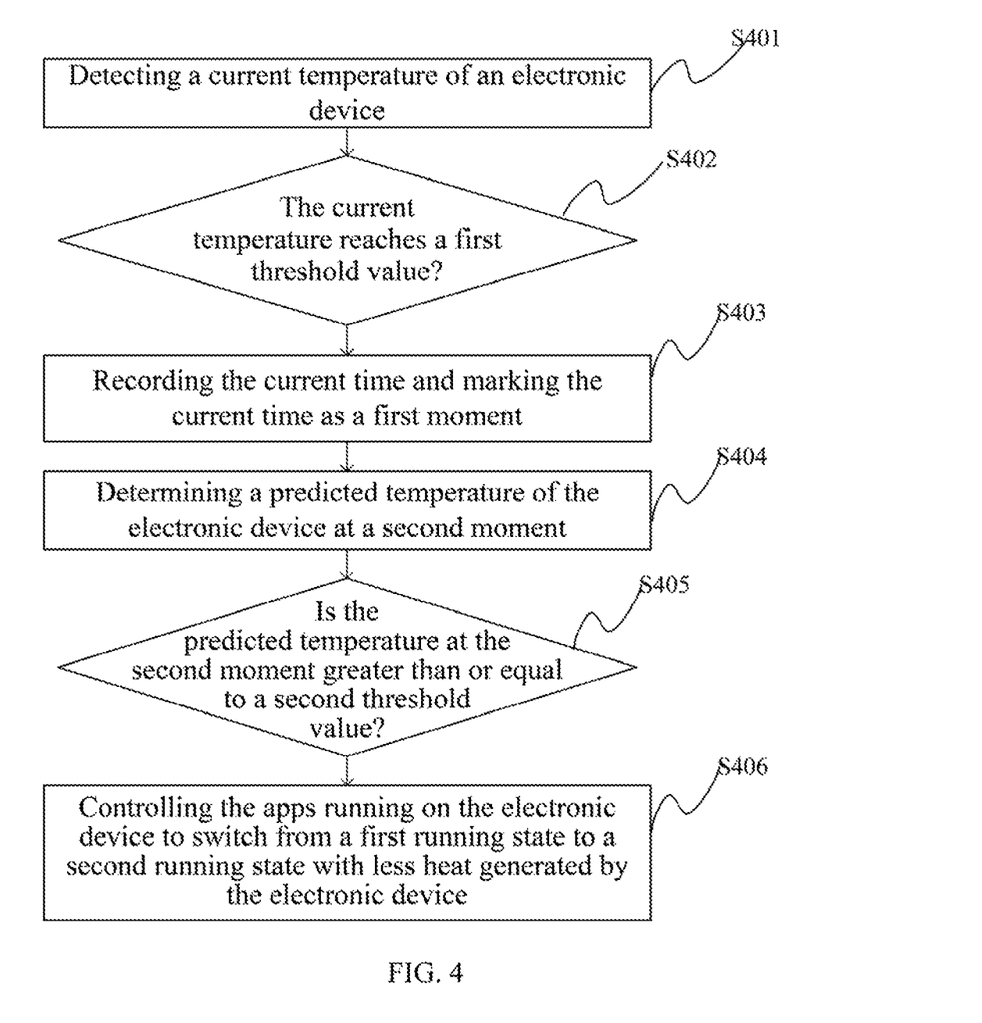
FIG. 4 illustrates a flow chart of an example of a control method consistent with the method illustrated in FIG. 2.

Further, the control of the operating state of the electronic device may be achieved by controlling the status of the apps running at the electronic device. FIG. 4 illustrates a flow chart of a control method consistent with the method illustrated in FIG. 2. Specifically, the control method illustrated in FIG. 4 provides a detailed process to control the operating state of the electronic device when the predicted temperature of the electronic device is determined to be greater than or equal to the second threshold value.

Referring to FIG. 4, Steps S401-S405 of the disclosed control method are consistent with the corresponding Steps S201-S205 of the method described above. After the predicted temperature of the electronic device at the second moment is determined to be greater than or equal to, the second threshold value, the control method may execute the following step:

In S406: Controlling the running apps at the electronic device to switch from a first running state to a second running state with less heat generated by the electronic device.

For example, the execution of Step S406 may include determining a number of target apps from the running apps at the electronic device, and then controlling the target apps to switch from a current first running state to a second running state.

The target apps may be the apps running at the electronic device with abnormal running parameters, such as the apps with an abnormal running state, the apps using an exceptionally large amount of processor resources, etc. Moreover, according to the disclosed method, at the beginning of the control process, the current running parameters of each running app at the electronic device may be acquired. The current running parameters of the running apps may include one or more from the processor occupation rates of download apps, the processor memory occupation rates of sensors, the processor memory occupation rates of players, the foreground and/or background status parameters, etc. Further, the obtained current running parameters may be compared to the preset running parameters (for example, the processor memory occupation rate during normal operation) of the corresponding apps and obtain the comparison results. The apps with current running parameters not matching the preset running parameters according to the comparison results may then be determined as target apps. As such, the target apps that are running abnormally may be found out from the background apps of the electronic device.

Further, when the target apps are controlled to switch from the first running state to the second running state, the switching between different running states of the target apps may be realized through various operation options, such as terminating the occupation of processor memories by the target apps, reducing the occupation rate of the processor memories by the target apps, turning off the execution of the target apps, etc. Accordingly, the heat generated by the electronic device may be reduced, which may prevent the actual temperature of the electronic device from exceeding the second threshold value at the second moment, and thus ensure that the electronic device is not overheated. As such, the normal operation of the electronic device may be sustained and the regular user experience in using the electronic device may be ensured.

Moreover, the detailed execution of Steps S401-S405 shown in FIG. 4 may refer to the corresponding content of the description of Steps S201-S205 shown in FIG. 2.

Figure 5:
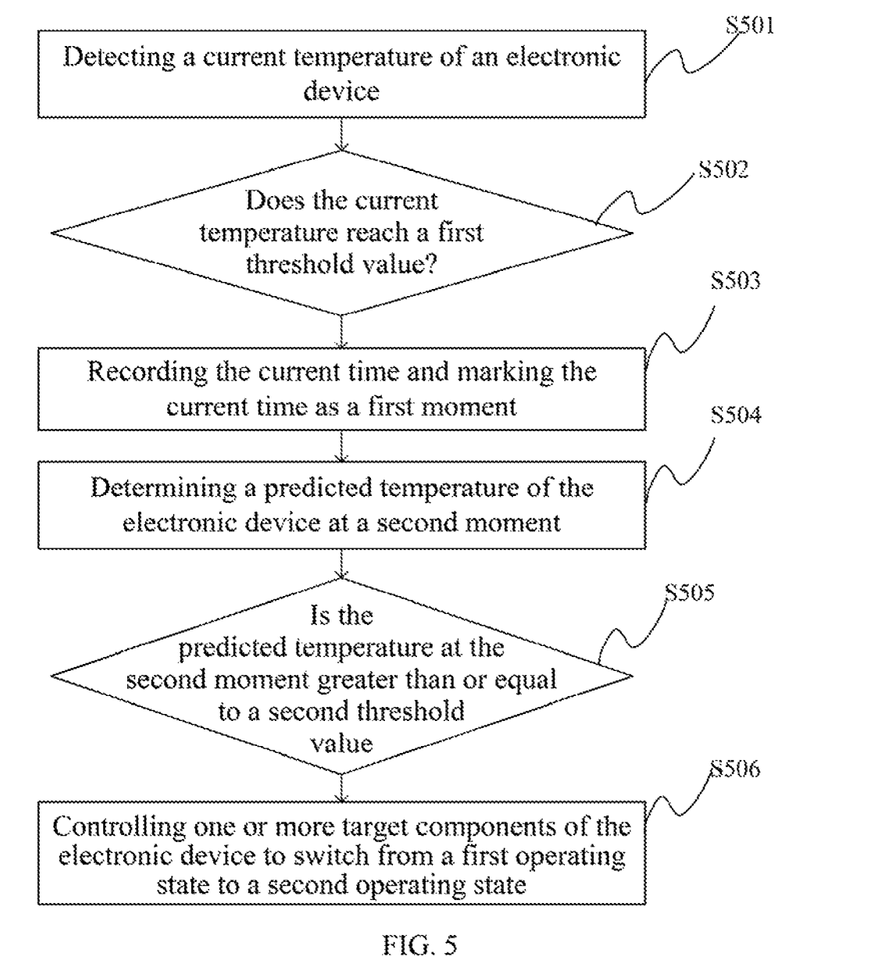
FIG. 5 illustrates a flow chart of another example of a control method consistent with the method illustrated in FIG. 2.

In another embodiment, the control of the operating state of the electronic device may be achieved by controlling the operating states of the components currently operating at the electronic device. FIG. 5 illustrates a flow chart of a control method consistent with the method illustrated in FIG. 2.

Referring to FIG. 5, Steps S501-S505 of the disclosed control method are consistent with the corresponding Steps S201-S205 of the method described above. After the predicted temperature of the electronic device at the second moment is determined to be greater than or equal to the second threshold value, the control method may execute the following step:

In S506: Controlling the operating state of one or more target components of the electronic device to switch from a current first operating state to a second operating state.

The target components may be components of the electronic device including one or more from the processor, the monitor, the battery, etc. Further, the operating'states of the target components may be controlled to reduce the heat generated by these target components during the operation of the electronic device.

For example, through various operation options including reducing the operating frequency of the processor, reducing the background light of the monitor, reducing the output current of the battery, etc. the execution of S506 may reduce the consumption speed of the battery at the electronic device. Accordingly, the heat generated by the electronic device may be reduced, which may prevent the actual temperature of the electronic device from exceeding the second threshold value at a second moment, and thus ensure that the electronic device is not overheated. As such, the normal operation of the electronic device may be sustained and the regular user experience in using the electronic device may be ensured.

Moreover, the detailed execution of Steps S501-S505 shown in FIG. 5 may refer to the corresponding content of the description of Steps S201-S205 shown in FIG. 2.

In other examples, after one or more target apps causing exceptionally overheating or running abnormally are determined, a set of target characteristics of the target apps may be created based on the target apps and the corresponding current running parameters. Further, the target characteristics may be stored. For example, the target characteristics may be stored into a database. Therefore, the target characteristics occurring when the electronic device experiences the anomalous condition may be stored, which may help future examination of the apps that are running abnormally at the electronic device.

For example, when the current temperature of the electronic device reaches the first threshold again, a number of first apps (e.g., pre-selected apps) running at the electronic device and the corresponding current running parameters may be determined. The pre-selected apps may include any app running at the electronic device. Further, the pre-selected apps and the corresponding running parameters may be compared separately to the stored target characteristics. When the stored target characteristics contain information matching certain pre-selected apps and the corresponding current running parameters, the pre-selected apps may be determined as target apps. As such, monitoring the apps that are running abnormally may be realized. Further, certain operations, such as switching the running state, etc. may be performed on the target apps to ensure that the real-time temperature of the electronic device is always kept below the second threshold value.

As used herein, the term "matching" refers to the current running parameters of pre-selected apps equal to or hither than the running parameters of the corresponding apps stored in the target characteristics. For example when the memory occupation rate of the pre-selected apps is equal to or higher than the memory occupation rate of the corresponding apps stored in the target characteristics, the pre-selected apps may be determined as target apps and further operations targeted on such apps may be performed to reduce the heat generated by the electronic device.

Figure 6:
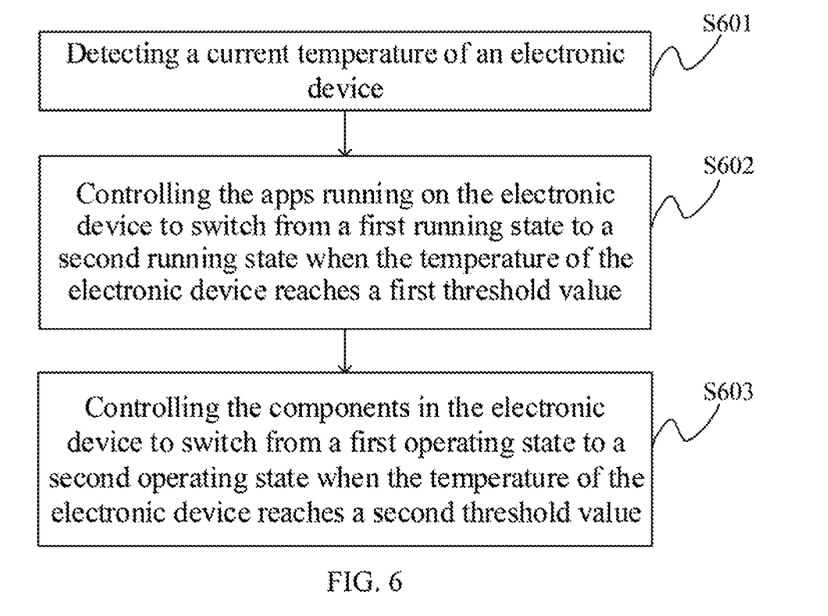
FIG. 6 illustrates a flow chart of another example of a control method consistent with various embodiments of the present disclosure.

FIG. 6 illustrates a flow chart of another control method consistent with the disclosed embodiments. The method may be used for temperature control in electronic devices such as cellphones, personal access device (PAD), laptop, desktop, etc. Referring to FIG. 6, the method may include the following steps.

In S601; Detecting the current temperature of the electronic device.

In one embodiment, the temperature of an electronic device may be collected by one or more temperature sensors arranged at the electronic device. The temperature of the electronic device may be the temperature of one or more certain components of the electronic device. For example, the temperature of the electronic device may be the temperature of the processor and/or the battery.

In S602: Controlling the apps running at the electronic device to switch from a current first running state to a second running state when the temperature reaches a preset first threshold value.

In one embodiment, the temperature of the central processing unit (CPU) at the electronic device may be compared to a first threshold value. The first threshold value may be a pre-heating temperature. The pre-heating temperature may refer to a temperature point that when the temperature of the electronic device reaches such a temperature point, the electronic device may tend to be rapidly heated up, and thus immediate heat control is required for the electronic device; otherwise, rapid heating of the electronic device may happen. The first threshold value may be determined based on experimental data.

Therefore, when the temperature of the CPU reaches the first threshold value, the running state of the apps running at the electronic device may be controlled. For example, the running apps at the electronic device may be controlled to switch from a current first running state to a second running state with less heat generated by the electronic device due to running the apps. The second running state may reduce the heat generated by the electronic device during running the apps. When the apps are running in the second running state, the temperature of the CPU may be kept at or below the first threshold value.

In S603: Controlling the components operating at the electronic device to switch from a current first operating state to a second operating state when the temperature of the electronic device reaches a preset second threshold value.

In one embodiment, the second threshold value may be a hot-touching temperature. The hot-touching temperature may refer to a temperature point that when the temperature of the electronic device reaches such a temperature point, the user may notice that the outer shell of the electronic device tends to be rapidly heated up, and thus immediate heat control is required for the electronic device; otherwise, overheating of the outer shell of the electronic device may happen and the user may have undesired experience when holding the electronic device. The second threshold value may be determined based on the temperatures of the CPU and the batteries, and other related data after both the CPU and the batteries of the electronic device reach thermal equilibrium.

Therefore, after the temperature of the CPU reaches the first threshold value and corresponding control is also made on the running states of the apps currently running at the electronic device, when the temperature of the electronic device continues to climb up and then reaches the second threshold value, the current operating states of the hardware components operating at the electronic device may be controlled. For example, the hardware components operating at the electronic device may be controlled to switch from a current first operating state to a second operating state with less heat generated by the electronic device due to the operation of the components. When the hardware components are operating in the second operating state, the temperature of the electronic device may be kept at or below the second threshold value.

According to the disclosed method for controlling the temperature of an electronic device, after obtaining the temperature of the electronic device, threshold judgments based on the obtained temperature value may be performed and then two schemes may be used for heat control of the electronic device. For example, when the temperature value reaches the first threshold value, the running states of the apps running at the electronic device may be switched; and when the temperature increases further to reach the second threshold value, the operating states of the components of the electronic device may be switched. As such, the disclosed method may take a first action to control the running states of the apps that may cause heating to sustain the operation of the electronic components and also ensure the desired user experience.

In a case that the temperature further increases, the scenario that heating is due to the use of resources by the apps may be excluded. Accordingly, the operating state of the components may be controlled. As such, the disclosed method may achieve step-by-step heating control for the electronic device. In addition, according to the disclosed method, before the temperature of the electronic device reaches the second threshold value, a temperature judgment may be made to determine whether the temperature of the electronic device reaches the first threshold value, and when the temperature reaches the first threshold value, the running states of the running apps may then be switched. Therefore, the disclosed method may realize pretreatment for controlling the heating of electronic device, and thus improve the user experience.

Figure 7:
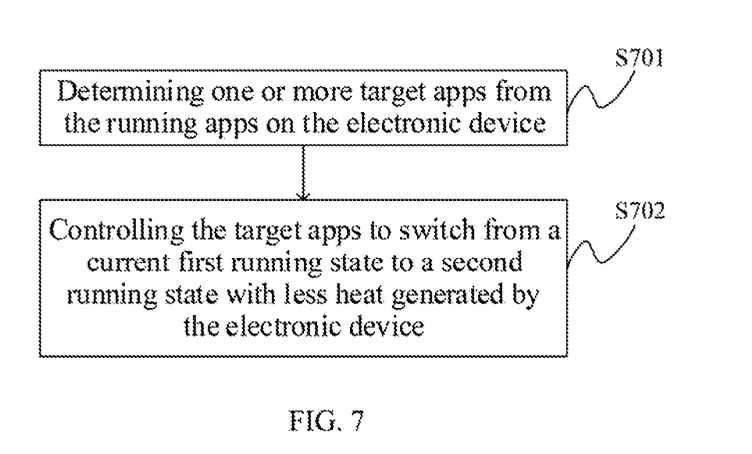
FIG. 7 illustrates a partial flow chart of the control method illustrated its FIG. 6.

The detailed control process of the method described above may be different depending on actual needs. FIG. 7 illustrates a partial flow chart of the control method is illustrated in FIG. 6. Specifically, the frames shown in FIG. 7 correspond to Step S602 shown in FIG. 6. Referring FIG. 7, the execution process may include the following steps.

In S701: Determining one or more target apps among the apps running at the electronic device.

The target apps may be the apps running at the electronic device with abnormal running parameters, such as the apps with an abnormal running state, the apps using an exceptionally large amount of processor resources, etc. In one embodiment, the target apps may be determined by the following steps.

First, the current running parameters of each running app at the electronic device may be acquired. The current running parameters of the running apps may include one or more from the processor occupation rates of download apps, the processor memory occupation rates of sensors, the processor memory occupation rates of players, foreground and/or background status parameters, etc. Further, the obtained current running parameters may be compared to the preset running parameters (for example, the processor memory occupation rate during normal operation) of the corresponding apps. As such, a number of first apps among the background apps running at the electronic device may be determined. Specifically, the current running parameters of the first apps do not match the preset running parameters of the first apps. Therefore, the first apps may be determined as the target apps, and the target apps running abnormally may be found out from the background apps of the electronic device.

In S702: Controlling the target apps to switch from a current first running state to a second running state with less heat generated by the electronic device.

When the target apps are controlled to switch from the first running state to the second running state, the switching between different running states of the target apps may be realized through various operation options, such as terminating the occupation of processor memories by the target apps, reducing the occupation rate of the processor memories by the target apps, turning off the execution of the target apps, etc. Accordingly, the heat generated by the electronic device may be reduced. In one embodiment, the control method may reduce the download speed of download apps to further reduce the occupation rates of the download apps at the CPU and the memories such that the heat generated by the electronic device due to running the download apps may be reduced.

Figure 8:
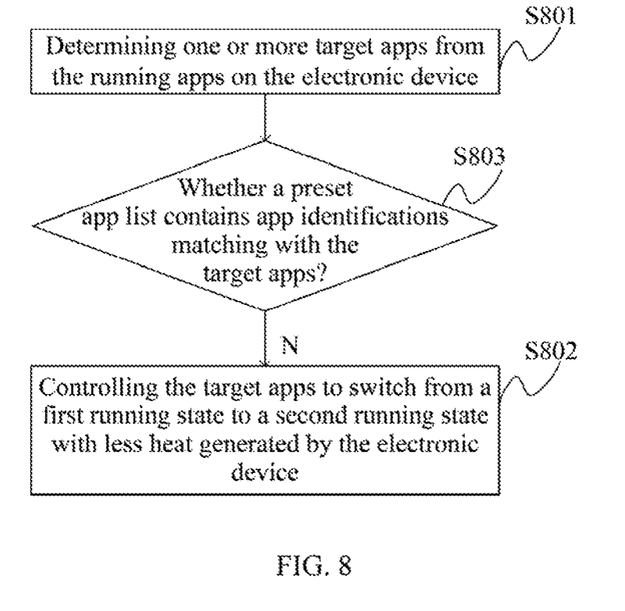
FIG. 8 illustrates a partial flow chart of the control method illustrated in FIG. 6.

FIG. 8 illustrates another partial flow chart corresponding to Step S602 shown in FIG. 6. Referring FIG. 8, Step S801 and Step S802 are consistent with Step S701 and Step S702 shown in FIG. 7, respectively. The detailed execution procedure for each of Step S801 and Step S802 may refer to the corresponding content of the description above for the steps shown in FIG. 7.

Prior to taking an action to control the target apps to switch the running states (S802), the disclosed method further includes the following step.

In S803: Determining whether a preset app list includes an app identification matching the app identification of a determined target app. When it is determined that all the app identifications in the preset app list do not match the app identification of the target app, the disclosed method for temperature control may move to execute Step S802.

The preset app list may include one or more app identifications. The app identifications may be used to identify the apps that require special protection. That is, the disclosed method may provide protection for certain apps. After a target app that causes beating of the electronic device is found out, the method may need to determine whether the app contains the corresponding app identification of the target app, That is, it may require to determine whether the target app needs to be protected. When protection is required for the target app, switching the running state of the target app, such as turning off the execution of the target app, etc may not be allowed. Only when the app list does not contain the app identification of the target app, indicating that the target app does not need to be specially protected, the method may then move to execute Step S802, i.e. controlling the target app to switch the running state. As such, the apps at the preset app list may be protected, and thus mistaken handling of these protected apps may be avoided.

Further, when the components currently operating at the electronic device are controlled to switch from the first operating state to the second operating state, the switch of operating state may be achieved by controlling the operating parameters of the currently-operating components of the electronic device. That is, the disclosed method for temperature control may control the currently-operating components of electronic device to change the operating parameter from a current first operating parameter to a second operating parameter. Specifically, heat generated by the electronic device when the components operating with the second operating parameters may be lower than the heat generated by the electronic device when the components operating with the first operating parameters. The operating parameters may be one or more from frequency parameters, display parameters, brightness parameters, etc. In one embodiment, by reducing the operating frequency of the processor of the electronic device and/or reducing the backlight rate or the brightness of the monitor of the electronic device, the output current of the batteries at the electronic device may be reduced, and thus the heat generated by the electronic device due to the operation of the components may also be reduced.

Figure 9:
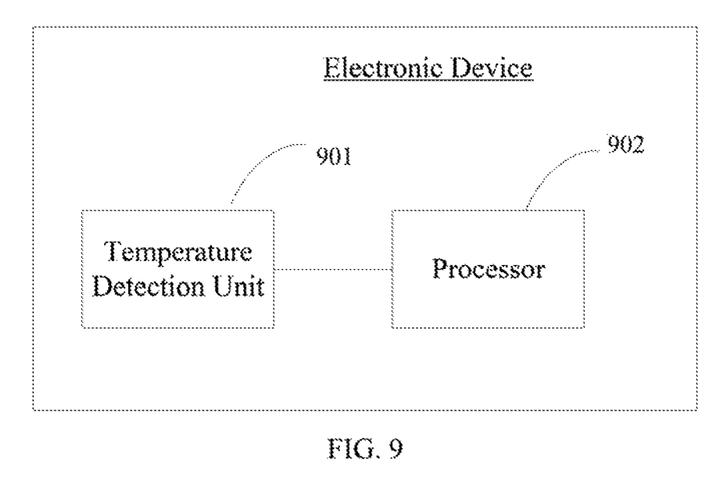
FIG. 9 illustrates a schematic structural view of an example of an electronic device consistent with various embodiments of the present disclosure.

The present disclosure also provides an electronic device corresponding to the method for temperature control. FIG. 9 illustrates a schematic structural view of an electronic device consistent with various embodiments of the present disclosure. Referring to FIG. 9, the electronic device may include a temperature detection unit 901 used to detect the current temperature of the electronic device, and a processor 902 used to control the electronic device to switch from a first operating state to a second operating state when the current temperature of the electronic device reaches a first threshold value.

The temperature detection unit 901 may use a temperature sensor to realize the temperature detection function. The temperature detection unit 901 may collect the temperature of a component of the electronic device, and then use the temperature of the component as the current temperature of the electronic device. The component may be a major heating component of the electronic device, such as a processor, a battery, etc.

In one embodiment, after the current temperature of the electronic device is obtained by the temperature detection unit 901, the processor 902 may be used to determine whether the current temperature reaches a preset first threshold value. When it is determined that the current temperature of the electronic device reaches the first threshold value at a first moment, the processor 902 may be used to determine a predicted temperature of the electronic device at a second moment with a preset time difference behind the first moment. Further, when the predicted temperature is greater than or equal to a preset second threshold value, the processor 902 may control the electronic device to switch from a first operating state to a second operating state such that the actual temperature of the electronic device at the second moment may be lower than the second threshold value.

For example, the processor 902 may first determine whether the current temperature reaches a preset first threshold value. When the current temperature of the electronic device reaches the first threshold value, the processor 902 may further determine a predicted temperature of the electronic device corresponding to a second moment which is behind the first moment with a preset time difference. The processor 902 may then determine whether the predicted temperature at the second moment reaches a preset second threshold value. Only when the predicted temperature at the second moment reaches the second threshold value, the processor 902 may then control the electronic device to switch from a first operating state to a second operating state to ensure the actual temperature of the electronic device at the second moment lower than the second threshold value.

The processor 902 may determine the predicted temperature of the electronic device at the second moment based on the current operating state of the electronic device such as the number of the running apps, the operating frequency of the processor, etc. The preset time difference may be determined based on the historical heating data of the electronic device such as the heat transfer rate of the electronic device.

For example, referring to FIG. 3, at a first moment, the temperature of the electronic device reaches a first threshold value. Accordingly, a predicted temperature at a second moment with a preset time difference behind the first moment may be predicted. Further, when the predicted temperature reaches a second threshold value, it is indicated that by keeping the current operating state, the electronic device may have a temperature reaching or even exceeding the second threshold value at the second moment. Therefore, the processor 902 may switch the operating state of the electronic device at the first moment to ensure the actual temperature of the electronic device stay below the second threshold value. As such, the normal operation of the electronic device may be sustained and the regular user experience in using the electronic device may be ensured.

Further, the processor 902 may have different approaches to control the electronic device to switch from the first operating state to the second operating state. In one embodiment, when the processor 902 controls the electronic device to switch from the first operating state to the second operating state, the switch of the operating state of the electronic device may be achieved by controlling the running apps at the electronic device to switch from a first running state to a second running state with less heat generated by the electronic device.

For example, the processor 902 may first determine one or more target apps from the running apps at the electronic device, and then control the target apps to switch from a current first running state to a second running state with less heat generated by the electronic device.

The target apps may be the apps running at the electronic device with an abnormal running state and/or the apps using an exceptionally large amount of processor resources. The processor 902 may first obtain the current running parameters of each running app at the electronic device including one or more from processor occupation rates of download apps, processor memory occupation rates of sensors, processor memory occupation rates of players, foreground and/or background status parameters, etc. Further, the obtained current running parameters may be compared to the preset running parameters (for example, the processor memory occupation rate during normal operation) of the corresponding apps and obtain the comparison results. The apps with current running parameters not matching the preset running parameters according to the comparison results may then be determined as target apps. As such, the target apps that are running abnormally may be found out from the background apps of the electronic device.

Moreover, when the processor 902 controls the target apps to switch from the first running state to the second running state, the switching between different running states of the target apps may be achieved through various operation options, such as terminating the occupation of processor memories by the target apps, reducing the occupation rate of the processor memories by the target apps, turning off the execution of the target apps, etc. Accordingly, the heat generated by the electronic device may be reduced, which may prevent the actual temperature of the electronic device from exceeding the second threshold value at a second moment, and thus ensure that the electronic device is not overheated. As such, the normal operation of the electronic device may be sustained and the regular user experience in using the electronic device may be ensured.

In another embodiment, when the processor 902 controls the electronic device to switch from the first operating state to the second operating state, the switch of the operating state of the electronic device may be achieved by controlling one or more target components of the electronic device to switch from a current first operating state to a second operating state.

The target components may be components of the electronic device including one or more selected from the processor 902, the monitor, the battery, etc. Further, the processor 902 may control the target components to switch the operating states to reduce the heat generated by these target components during the operation of the electronic device.

For example, the processor 902 may reduce the operating frequency of the processor, reduce the background light of the monitor, or reduce the output current of the battery to reduce the consumption speed of the battery of the electronic device. Accordingly, the heat generated by the electronic device may be reduced, which may prevent the actual temperature of the electronic device from exceeding the second threshold value at a second moment, and thus ensure that the electronic device is not overheated. As such, the normal operation of the electronic device may be sustained and the regular user experience in using the electronic device may be ensured.

In other examples, after one or more target apps causing exceptionally overheating or running abnormally are determined, the processor 902 may create a set of target characteristics of the target apps based on the target apps and the corresponding current running parameters. Further, the target characteristics may be stored. For example, the target characteristics may be stored into a database. Therefore, the target characteristics occurring when the electronic device experiences the anomalous condition may be stored, which may help future examination of the apps that are running abnormally at the electronic device.

For example, when the current temperature of the electronic device collected by the temperature detection unit 901 reaches the first threshold again, the processor 902 may determine a number of pre-selected apps running at the electronic device and the corresponding current running parameters. The pre selected apps may include any app running at the electronic device. Further, the pre-selected apps and the corresponding running parameters may be compared separately to the stored target characteristics. When the stored target characteristics contain information matching certain pre-selected apps and the corresponding current running parameters, the pre-selected apps may be determined as target apps. As such, monitoring the apps that are running abnormally may be realized. Further, the processor 902 may perform certain operations, such as switching the miming state, etc. on the target apps to ensure that the real-time temperature of the electronic device is always kept below the second threshold value.

In other embodiment, the processor 902 may also be used to control the running apps at the electronic device to switch from a current first running state to a second running state when the temperature of the electronic device obtained by the temperature detection unit 901 reaches a preset first threshold value. Further, when the temperature of the electronic device reaches a preset second threshold value, the processor 902 may control the components currently operating in electronic device to switch from a current first operating state to a second state. The second threshold value may be greater than the first threshold value.

Specifically, when the processor 902 controls the electronic device to switch from the current first operating state to the second operating state, the running apps at the electronic device are controlled to switch from the current first running state to the second running state with reduced heat generated by the electronic device. When the processor 902 controls the components currently operating in electronic device to switch from a current first operating state to a second operating state, the currently-operating components of the electronic device may be controlled to switch from the first operating state to the second operating state with reduced heat generated by the electronic device.

According to the disclosed electronic device, after the temperature of the electronic device reaches the first threshold value and corresponding control is also made on the running states of the apps running at the electronic device, when the temperature of the electronic device continues to climb up and then reaches the second threshold value, the current operating to states of the hardware components operating at the electronic device may be controlled. As such, a first action may be taken to control the running states of the apps that may cause heating to sustain the operation of the electronic components and also to ensure the desired user experience. In a case that the temperature further increases, the scenario that heating is due to the use of resources by the apps may be excluded. Accordingly, the operating state of the components may be controlled. As such, the disclosed method may achieve step-by-step heating control for the electronic device.

Further, when the processor 902 controls the running apps at the electronic device to switch from the current first running state to the second running state with reduced heat generated by the electronic device, a number of target apps may first be determined from the running apps at the electronic device. The target apps may be the background apps running with abnormal running parameters, such as apps with an abnormal running state, apps using an exceptionally large amount of processor resources, etc. Further, the target apps may then be controlled to switch the first running state to the second running state with reduced heat generated by the electronic device.

Moreover, the processor 902 may determine target apps through the following steps. First, the current running, parameters of each running app at the electronic device may be acquired. The current running parameters of running apps may include one or more from processor occupation rates of download apps, processor memory occupation rates of sensors, processor memory occupation rates of players, foreground and/or background status parameters, etc. Further, the obtained current running parameters may be compared to the preset running parameters (for example, the processor memory occupation rate during normal operation) of the corresponding apps. As such, a number of first apps among the background apps running at the electronic device may be determined. Specifically, the current running parameters of the first apps do not match the preset running parameters of the first apps. Therefore, the first apps may be determined as the target apps, and the target apps that are running abnormally may be found out from the background apps of the electronic device.

In other embodiment, when the processor 902 controls the components currently operating at the electronic device to switch from a first operating state to a second operating state, the switch of the operating state may be achieved by controlling the operating parameters of the components currently operating t the electronic device. That is, the processor 902 may control the currently-operating components of electronic device to change the operating parameter from a current first operating parameter to a second operating parameter. Specifically, heat generated by the electronic device when the components operating with the second operating parameters may be lower than the heat generated by the electronic device when the components operating with the first operating parameters. The operating parameters may be one or more from frequency parameters of the processor 902, display parameters, brightness parameters, etc. In one embodiment, the processor reduces the operating frequency of the processor of the electronic device and/or reduces the backlight rate or the brightness of the monitor of the electronic device to reduce the output current of the batteries at the electronic device, and thus reduce the heat generated by the electronic device due to the operation of the components.

In order to protect certain special apps in the background apps running at the electronic device, after the target apps running at the electronic device are determined, the processor 902 may also be used to determine whether a preset app list contains the corresponding app identification of each target app, i.e. to determine whether a target app needs to be protected and thus may not need to switch the running state. Only when the app list does not contain the app identification of the target app, indicating that the target app does not need to be specially protected, the processor 902 may then control the target app to switch from the first running state to the second running state, i.e. to complete the switch of the running state. For example, for the target apps whose app, identifications are not included in the preset app list, the processor 907 may turn off the execution of the target apps or reduce the portion of the battery output current consumed by the target apps to switch the running state of the target apps. Therefore, because the processor 902 determines whether the app identification of a target app is included in the preset app list prior to switching the corresponding running state, the apps at the preset app list may be protected, and mistaken handling of these protected apps may be avoided.

According to the disclosed method for temperature control and electronic device, after the current temperature of the electronic device is obtained, a threshold judgment is performed on the current temperature of the electronic device. The current temperature of the electronic device is compared to a preset first threshold value. When the current temperature of the electronic device reaches the first threshold value, the electronic device is then controlled to switch from a current first operating state to a second operating state with less heat generated by the electronic device. As such, heat control for the electronic device is achieved.

Further, in the present disclosure, relational terms such as first, second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

From the illustration of various embodiments of the present disclosure, one may understand that the disclosed method and electronic device may be realized by a software program in combination with a necessary hardware platform. Based on this understanding, all or a part of the generic principles or the scope of the invention may be embodied in software products. The computer software products may be stored in storage media and may include a plurality of commands to instruct a computer system (such as personal computer, server, network system, etc.) or a processor to execute all or a part of the procedures described in various embodiments consistent with the present disclosure. The storage media may include U disk, mobile hard disk, read-only memory (ROM), random access memory (RAM), magnetic disk, optical disk, or any other appropriate media that can be used to store program code.

Various embodiments of the present specification are described in a progressive manner, in which each embodiment focusing on aspects different from other embodiments, and the same and similar parts of each embodiment may be referred to each other. Because the disclosed devices correspond to the disclosed methods, the description of the disclosed devices and the description of the disclosed methods may be read in combination or in separation.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present to invention is not intended to be limited to the embodiments shown herein but is to be accorded the widest scope consistent with the principles and novel features disclosed herein.

What is claimed is:

1. A control method, comprising:
   detecting a current temperature of an electronic device;
   in response to the current temperature matching a first condition in which the current temperature reaches a first threshold value at a first moment, controlling an app at the electronic device to switch from a first running state to a second running state by:
      determining a predicted temperature of the electronic device at a second moment after the first moment having a time difference there-between;
      determining whether the predicted temperature of the electronic device at the second moment is greater than or equal to a second threshold value; and
      in response to the predicted temperature at the second moment greater than or equal to the second threshold value, controlling the app currently running at the electronic device to switch from the first running state to the second running state, wherein, in the second running state of the app, the electronic device at the second moment has an actual temperature lower than the second threshold value; and
   in response to the current temperature matching a second condition, controlling components at the electronic device to switch from a first operating state to a second operating state.

2. The method according to claim 1, wherein determining the predicted temperature of the electronic device at the second moment includes:
   acquiring a current operating state of the electronic device; and
   determining the predicted temperature of the electronic device at the second moment based on the current operating state.

3. The method according to claim 1, further including:
   collecting historical heating data of the electronic device, wherein the historical heating data includes a heat transfer rate of the electronic device; and
   setting the time difference between the first moment and the second moment based on the heat transfer rate.

4. The method according to claim 1, wherein:
   controlling the components currently operating at the electronic device to switch from the first operating state to the second operating state in response to the current temperature matching the second condition includes:
      when the current temperature reaches a third threshold value, controlling the components currently operating at the electronic device to switch from the first operating state to the second operating state, wherein the third threshold value is greater than the first threshold value.

5. The method according to claim 4, wherein:
   controlling the components currently operating at the electronic device to switch from the first operating state to the second operating state further includes: controlling the components currently operating at the electronic device to switch from the first operating state to the second operating state to reduce heat generated by the electronic device.

6. The method according to claim 1, wherein controlling the app running at the electronic device to switch from the first running state to the second running state further includes:
   determining one or more target apps from apps running at the electronic device, and
   controlling the target apps to switch from the first running state to the second running state to reduce heat generated by the electronic device.

7. The method according to claim 6, further including:
   prior to determining the target apps from the apps running at the electronic device, storing running parameters of the apps corresponding to a temperature of the electronic device lower than the second threshold value; and
   wherein determining the one or more target apps from the apps running at the electronic device further includes:
      acquiring current running parameters of each app running at the electronic device;
      comparing the current running parameters with the stored running parameters; and
      when the current running parameters of a first app among the apps do not match the stored running parameters, determining the first app as a target app.

8. The method according to claim 6, wherein:
   prior to controlling the one or more target apps to switch from the first running state to the second running state to reduce heat generated by the electronic device, further includes:
   creating an app list including at least one app identification, wherein for each app corresponding to an app identification on the app list, switching a running state of the app is not allowed; and
   after determining the one or more target apps, further including:
      determining whether an app identification of a target app matches with the app identifications on the app list; and
      when the app identification of the target app does not match the app identifications on the app list, controlling the target app to switch from the first running state to the second running state.

9. The method according to claim 4, wherein controlling the components operating at the electronic device to switch from the first operating state to the second operating state further includes:

controlling the components operating at the electronic device to switch from the first operating state to the second operating state to reduce heat generated by the electronic device.

10. An electronic device, comprising:
a temperature sensor; and
a processor, wherein:
   the temperature sensor detects a current temperature of the electronic device;
   in response to the current temperature matching a first condition in which the current temperature of the electronic device reaches a first threshold value at a first moment, the processor controls an app at the electronic device to switch from a first running state to a second running state by:
      determining a predicted temperature of the electronic device at a second moment after the first moment having a time difference there-between;
      determining whether the predicted temperature of the electronic device at the second moment is greater than or equal to a second threshold value; and
      in response to the predicted temperature at the second moment greater than or equal to the second threshold value, controlling the app currently running at the electronic device to switch from the first running state to the second running state, wherein, in the second running state of the app, the electronic device at the second moment has an actual temperature lower than the second threshold value; and
   the processor controls currently-operating components at the electronic device to switch from a first operating state to a second operating state in response to the current temperature matching a second condition.

11. The electronic device according to claim 10, wherein the processor:
   acquires a current operating state of the electronic device; and
   determines the predicted temperature of the electronic device at the second moment based on the current operating state.

12. The electronic device according to claim 10, wherein the processor:
   collects historical heating data of the electronic device, wherein the historical heating data includes a heat transfer rate of the electronic device; and
   sets the time difference between the first moment and the second moment based on the heat transfer rate.

13. The electronic device according to claim 10, wherein the processor:
   controls the components currently operating at the electronic device to switch from the first operating state to the second operating state in response to the current temperature reaching a third threshold value, wherein the third threshold value is greater than the first threshold value.

14. The electronic device according to claim 10, wherein the processor:
   controls the components currently operating at the electronic device to switch from the first operating state to the second operating state to reduce heat generated by the electronic device.

15. The electronic device according to claim 10, wherein the processor:
   determines one or more target apps from apps running at the electronic device, and
   controls the target apps to switch from the first running state to the second running state to reduce heat generated by the electronic device.

16. The electronic device according to claim 15 further including stored running parameters of the apps corresponding to a temperature of the electronic device lower than the second threshold value, and accordingly, the processor:
   acquires current running parameters of each app running at the electronic device;
   compares the current running parameters to the stored running parameters; and
   determines the first app as a target app when the current running parameters of a first app among the apps do not match the stored running parameters.

17. The electronic device according to claim 15 further including an app list including at least one app identification, wherein:
   for each app corresponding to an app identification on the app list, switching a running state of the app is not allowed; and
   after determining the one or more target apps, the processor:
      determines whether an app identification of a target app matches the app identifications on the app list; and
      when the app identification of the target app does not match the app identifications on the app list, controls the target app to switch from the first running state to the second running state.

18. The electronic device according to claim 13, wherein the processor:
   controls the components operating at the electronic device to switch from the first operating state to the second operating state to reduce heat generated by the electronic device.

* * * * *